Nov. 18, 1941.   H. BARNETT   2,263,375
PEN LIFTING MECHANISM
Filed June 16, 1938
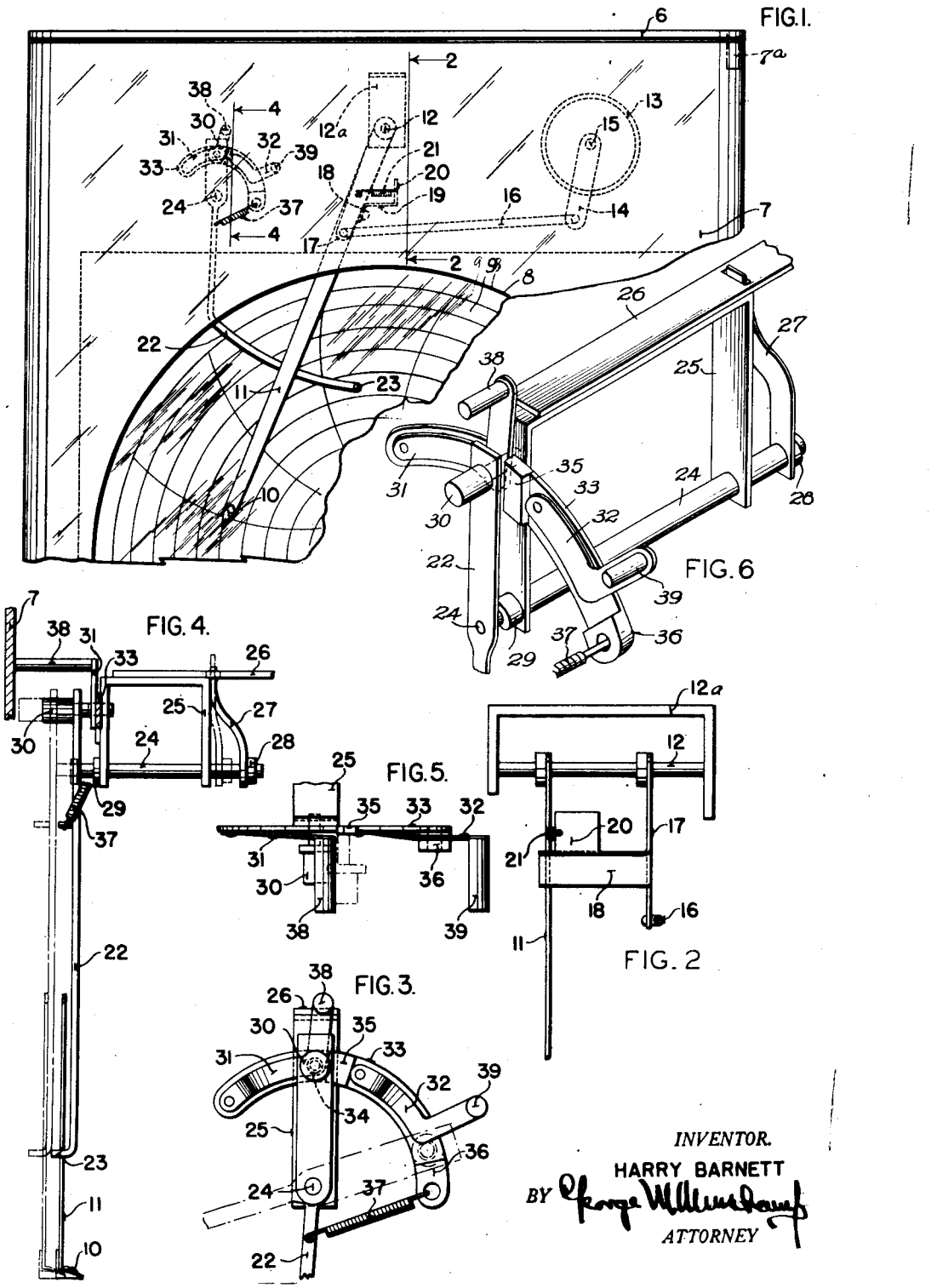
INVENTOR.
HARRY BARNETT
BY *George William Davey*
ATTORNEY Patented Nov. 18, 1941

2,263,375

UNITED STATES PATENT OFFICE 2,263,375

PEN LIFTING MECHANISM

Harry Barnett, Philadelphia, Pa., assignor to The Brown Instrument Company, Philadelphia, Pa., a corporation of Pennsylvania Application June 16, 1938, Serial No. 214,040

9 Claims. (Cl. 234—72)

The present invention relates to recording instruments and, more particularly, to a means for lifting a recording pen of such an instrument off its chart so that the chart may be changed or inspected.

It is usual in recording instruments of the type in which this invention is used to have the pen on the end of an arm made of some type of resilient material which normally biases the pen into engagement with the chart. Some means is essential to hold the pen away from the chart in order that an inspector may have both hands free to change the chart. It is, at present, common practice to have an automatic pen lifter, such as is disclosed in Brown Patent 1,285,919, to lift the pen from engagement with the chart when the door of the instrument casing is opened. This, however, is not enough since it is still rather difficult to remove and replace charts without moving them against the pen and getting undesired marks thereon. Furthermore, it is not always desirable to lift the pen from the chart every time the instrument casing is opened.

My invention obviates these difficulties by providing a device which may be manually moved, after the casing door is opened, to lift the pen from the chart and hold it in lifted position, or to lift the pen and then move it entirely away from above the chart and hold the pen in its shifted position. In either case, the pen is automatically moved back to its position on the chart when the door of the casing is closed.

The various features of novelty which characterize my invention are pointed out with particularity in the claims annexed to and forming a part of this specification. For a better understanding of the invention, however, its advantages and specific objects obtained with its use, reference should be had to the accompanying drawing and descriptive matter in which I have illustrated and described a preferred embodiment of the invention.

In the drawing:

Fig. 1 is a front view of an instrument showing the use of my invention;

Fig. 2 is a view taken on line 2—2 of Fig. 1;

Fig. 3 is an enlarged front view of the pen lifting apparatus;

Fig. 4 is a view taken on line 4—4 of Fig. 1;

Fig. 5 is a view from the top of Fig. 3; and

Fig. 6 is a perspective view of the pen lifting mechanism.

Referring to Fig. 1, there is shown an instrument casing 6 which is provided with a door 7 that may be hinged at either side, but is shown as being pivoted to the casing 6 by a hinge pin 7a, and that may be opened to give access to the mechanism contained within the casing. The door 7 is provided with an opening 8 that ordinarily has a glass window in it so that the chart 9, upon which a suitable record is made by a pen 10, may be viewed without opening the door. The pen 10 is attached to the lower end of a suitable arm 11 which is freely pivoted on a shaft 12 supported by a yoke 12a that is located within the casing 6.

The pen 10 is moved across the chart by a measuring element that may be responsive to any measurable condition. As shown here, by way of example, a measuring element 13, that may be responsive to pressure or temperature, is attached to the casing 1, and as the condition to which it is responsive varies, expansion of the measuring element moves an arm 14 around a shaft 15. This arm is connected by a link 16 to an arm 17 attached to the shaft 12. Therefore, the arm 17 moves as the condition being measured changes, and its movement is transferred by a lost-motion connection to the pen arm 11.

The arm 17 is formed with a part 18 bent forwardly until it lies in the plane of pen arm 11. At this point, it is bent away from the pen arm, as at 19, and upwardly, as at 20. The pen arm 11 is then resiliently connected to the end 20 by a spring 21. With this connection, it will be seen that as arm 17 moves to the left, the pen arm will be forced toward the outer edge of the chart 9 by part 18, and as arm 17 moves to the right, the pen arm will be pulled toward the center of the chart by spring 21. The spring 21 will also permit the pen arm to be moved to the left independently of arm 17 and without interfering with the position of the latter.

Periodically the chart 9 must be renewed, and when this is to be done, it is desirable to move the pen arm 11 away from the face of the chart so that it can easily be lifted away from its support. In order to accomplish this, an arm 22, having an out-turned end 23, is pivoted at 24 and extends down and across the chart 9 below the pen arm 11. A means is provided for first lifting this arm 22 outward, so that the pen will be moved away from the chart, and then around its pivot so that end 23 will engage the pen arm and move it to the left beyond the chart edge.

A support for the pivot shaft 24 is provided by a yoke-member 25 that is in turn attached to a bracket 26 which is fastened in any suitable manner in the instrument casing. The shaft 24 is journaled for sliding and rotative movement in the arms of yoke 25 and is normally urged to the right in Fig. 4 or the back of the casing by a spring 27 that encircles shaft 24 at its lower end and passes through a guiding opening in bracket 26 at its upper end. The spring bears against a collar 28 on shaft 24 to urge that shaft and arm 22 to the right, which movement is limited by a second collar 29, on the other end of the shaft 24, below arm 22, and in front of the front leg of yoke 25.

The arm 22 and its shaft 24 can be moved outwardly, or to the left in Fig. 4, against the force of spring 27 by means of a pin 30 that is fastened to the arm 22, which pin is provided with a knurled head, and extends, in its normal position, through the front leg of yoke 25. After the arm 22 is moved out, it may be rotated so that its end 23 will engage and move the pen arm 11 from above the chart. The arm is held in its rotated position by one of a pair of springs, depending upon how far it is rotated.

These springs 31 and 32 are angular in shape and are each attached at one end to a curved plate 33 which is in turn fastened to the front leg of yoke 25. Each of these springs, at its corner, normally stands slightly above the surface of plate 33, as is best shown in Fig. 5, and the raised corner acts as a stop to hold the pin 30 in its angularly adjusted position. It should be noted that the spring 31 is provided with an opening 34 that is aligned with opening in plate 33 and the front leg of yoke 25 through which pin 30 may project when the arm 22 is in its normal position as shown in full lines in Figures 3 and 4, and that a raised portion 35 is formed on the surface of plate 33 between the springs, which portion is equal in height to the thickness of the springs 31 and 32. The lower right-hand end of plate 33 is provided with an up-turned end 36 that serves to act as a stop for pin 30, and to act as a support for one end of a spring 37 whose other end is attached to arm 22 below its axis to bias that arm in a counter-clockwise direction.

In the operation of the pen-lifting mechanism, the pin 30 is first pulled outwardly so that arm 22 will lift the pen 10 from the chart 9, and is then moved in a clockwise direction against the force of spring 37 until the pin 30 is beyond the corner of one of the springs 31 or 32. The pin 30 is then released, and the upstanding corner of spring 31 or 32, depending upon the amount of rotation of arm 22, holds the arm 22 in its adjusted position. If it is desired to merely lift the pen from the chart without disturbing its angular position, pin 30 is moved clockwise until it will be beyond the corner of spring 31, as shown in dotted lines in Figure 5, and end 23 of arm 22 will not have been moved far enough to engage the pen arm. If, however, it is desired to move the pen arm 11 entirely off the chart, the pin 30 will be moved clockwise until it is beyond the corner of spring 32 as shown in dotted lines in Figure 3. During this movement, end 23 of arm 22 will engage the side of the pen arm and move it clockwise against the force of spring 21.

In order to allow the pen arm to return to its original position, it is only necessary to depress the corners of springs 32 and 31, and the spring 37 will move the arm 22 back to its normal position. On its return, or counter-clockwise movement, pin 30 will ride along the top of spring 32, projection 35 and spring 31 until it reaches opening 34 and the aligned openings in plate 33 and yoke 25, at which time spring 27 will move the pin 30 inwardly so that arm 22 will move toward the chart and permit the pen to return into engagement therewith. As the arm 22 is moving counter-clockwise under the influence of spring 37, the pen arm is being returned into engagement with the portion 18 of arm 17 by spring 21, so that before the arm 22 moves toward the chart, the pen will be in its proper position.

It is often desirable to have the pen automatically returned to its position along the chart, and this may be accomplished by my device in a very simple manner. On the end of each of the springs 31 and 32 there is provided respectively a pin 38 and 39, which pins extend forwardly toward the front of the casing to an extent where they will engage the inner surface of the casing door 7 when it is closed. In this manner, as the door of the instrument casing is closed, the springs 31 and 32 are depressed below the pin 30, and the spring 37 is then free to move arm 22 counter-clockwise until pin 30 passes through the hole 34 in spring 31 and the aligned holes in plate 33 and yoke 25 and is moved by spring 27 into its inner position where the pen is in engagement with the chart.

From the above description, it will be seen that I have provided a semi-automatic pen-lifting mechanism, that can be incorporated into existing instruments or can be built into new instruments, and one that is efficient and flexible. The pen-lifting mechanism permits the pen to first be lifted from the chart and then moved to one side thereof and returned to its original position in a similar manner with a minimum of complication and effort, and without making a false record on the chart.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In a recording instrument having a casing provided with a door, the combination with a chart supporting means, a pen adapted to record upon a chart on said chart supporting means, and a pen arm supporting said pen for movement across said chart, of means engaging said pen arm to lift said pen above said chart and thereafter move it beyond the edge of said chart whereby the entire chart will be exposed to view, and means operated upon closure of the casing door to automatically return said pen to its position in engagement with said chart after having been moved beyond the chart edge.

2. In a recording instrument, the combination with a chart supporting means, a pen in engagement with a chart on said chart supporting means, and a pen arm supporting said pen for movement across said chart, of an arm having a projection on its end extending between said pen arm and chart, means whereby said arm may be lifted into engagement with said pen arm and moved across said chart whereby said pen will be lifted and moved by said arm from above said chart.

3. In a recording instrument, the combination with a chart supporting means, a pen adapted to engage a chart on said chart supporting means, and a pen arm to support and move said pen across said chart, of means engaging said pen arm to lift said pen and swing it across said chart, means to hold said pen in its adjusted position and means to oppose movement of said pen, whereby upon release of said holding means, said pen will be returned to its normal position by said opposing means.

4. In a recording instrument, the combination with a casing having a door, a chart supporting means within said casing, a pen adapted to engage a chart on said chart supporting means, and a pen arm to support said pen and move it across said chart, of an arm having a projection on its end extending between said chart and pen arm, means to resiliently hold said arm in a normal position across said chart and beneath said pen arm, means whereby said arm may be lifted and moved across said chart whereby said pen will first be lifted above the chart, then moved to one side thereof, means to lock said arm in its adjusted position, and means operated by said door upon closure thereof to release said lock means whereby said resilient holding means can move said arm to its normal position and permit the return of said pen into engagement with the chart.

5. In a recording instrument, the combination with a chart supporting means, a pen adapted to engage a chart on said chart supporting means, and a pen arm to support said pen for movement across said chart, of an arm with an up-turned end extending across said chart beneath said pen arm, lifting and moving means movable to a first position whereby said arm may be lifted to raise said pen from said chart, means to hold said arm in its first position, said lifting and moving means upon further movement to a second position bringing the end of said arm into engagement with said pen arm to move the pen beyond the edge of said chart, and a second holding means to hold the arm in its second position.

6. In a recording instrument, the combination with a casing having a door, a chart supporting means within said casing, a pen adapted to rest upon a chart on said chart supporting means, and a pen arm supporting said pen for movement across said chart, of an arm having an upturned end extending across said chart beneath the pen arm, resilient means to normally hold said arm beneath said pen arm and across said chart, lifting and moving means movable to a first position whereby said arm may be lifted to raise said pen from said chart, a first holding means to hold said arm in a first position, said lifting and moving means upon further movement bringing the end of said arm into engagement with said pen arm to move the pen from above the chart, a second holding means to hold said arm in a second position, and means operated by said door upon closure thereof to release both of said holding means whereby said resilient means can return said arm to its normal position and let said pen return to its position of rest upon said chart.

7. In a recording instrument having a chart supporting means and a pen supported by a pen arm in engagement with a chart on said chart supporting means, the combination of a pivoted arm adapted to extend between said chart and pen arm, resilient means to normally hold said arm below the plane of the pen arm, means whereby said arm may be lifted into engagement with the pen arm and rotated, and resilient means to oppose rotation of said arm.

8. In a recording instrument having a chart supporting means and a pen supported by a pen arm in engagement with a chart on the chart supporting means, the combination of a pivoted arm adapted to extend between the pen arm and chart, resilient means to hold the arm in its position below the plane of the pen arm, means whereby said arm may be lifted and moved around its pivot, resilient means to oppose movement of said arm around its pivot and a plurality of locking members to hold said arm in a plurality of adjusted positions.

9. In a recording instrument, the combination with a chart supporting means, a pen adapted to engage a chart on said chart supporting means, and a pen arm to support said pen for movement across said chart, of positive means to move said pen arm in one direction, a resilient connection between said means and pen arm whereby said pen arm can be moved independently of said means in said direction, and means to move said pen arm in said direction independently of said positive means.

HARRY BARNETT.